(12) United States Patent
Gagey et al.

(10) Patent No.: US 10,056,927 B2
(45) Date of Patent: Aug. 21, 2018

(54) DEVICE AND METHOD FOR PROCESSING A SIGNAL RECEIVED BY A RECEIVER DISRUPTED BY A TRANSMITTER

(71) Applicant: AIRBUS DS SLC, Elancourt (FR)

(72) Inventors: Olivier Gagey, Paris (FR); Philippe Mege, Bourg la reine (FR); Christophe Molko, Villepreux (FR); Olivier Perrin, Saint-Aubin d'Ecrosville (FR)

(73) Assignee: AIRBUS DS SLC, Elancourt (FR)

( * ) Notice: Subject to any disclaimer, the term of this patent is extended or adjusted under 35 U.S.C. 154(b) by 0 days.

(21) Appl. No.: 15/614,955

(22) Filed: Jun. 6, 2017

(65) Prior Publication Data
US 2017/0353202 A1 Dec. 7, 2017

(30) Foreign Application Priority Data

Jun. 6, 2016 (FR) ...................................... 16 55130

(51) Int. Cl.
| | |
|---|---|
| *H04B 1/38* | (2015.01) |
| *H04L 5/16* | (2006.01) |
| *H04B 1/10* | (2006.01) |
| *H04B 1/12* | (2006.01) |

(52) U.S. Cl.
CPC ............. *H04B 1/1027* (2013.01); *H04B 1/12* (2013.01)

(58) Field of Classification Search
CPC ..... H04L 25/0266; H04L 7/033; H04L 25/06; H04L 5/023; H04L 1/243; H04L 1/0001; H04L 1/0009; H04L 1/1854; H04L 1/06; H04L 25/0204; H04M 11/06; G01R 31/31716; H04B 1/123; H04B 7/002; H04B 1/109

USPC ................ 375/219–236, 259–285, 316–352
See application file for complete search history.

(56) References Cited

U.S. PATENT DOCUMENTS

| | | | | | |
|---|---|---|---|---|---|
| 5,544,155 | A | * | 8/1996 | Lucas | ................ H04B 1/70755 370/203 |
| 5,544,167 | A | * | 8/1996 | Lucas | .................... H04B 1/707 370/206 |
| 6,704,349 | B1 | * | 3/2004 | Masenten | .............. H04B 1/123 375/219 |
| 7,072,614 | B1 | * | 7/2006 | Kasperkovitz | ......... H04B 1/123 455/24 |

(Continued)

OTHER PUBLICATIONS

Preliminary Search Report as issued in French Patent Application No. 1655130, dated Feb. 20, 2017.

*Primary Examiner* — James M Perez
(74) *Attorney, Agent, or Firm* — Pillsbury Winthrop Shaw Pittman LLP (57) ABSTRACT

A device for processing a received signal by a receiver disrupted by a transmitter, wherein the transmitters and receiver are co-located, includes: a first coupler configured to take a first reference signal; an analog circuit for processing the first reference signal; a second coupler configured to combine the modified reference signal with the signal received by an antenna of the receiver; a first analog-to-digital conversion module digitizing the first reference signal; the second analog conversion module digitizing the combined signal in order to deliver a digital combined signal to the digital signal-processing device, wherein signal-processing device delivers a resulting digital signal to a data-processing module of the receiver device.

16 Claims, 6 Drawing Sheets

(56) References Cited

U.S. PATENT DOCUMENTS

| | | | | |
|---|---|---|---|---|
| 7,525,482 B1* | 4/2009 | Lackey | G01S 19/215 | 342/357.31 |
| 8,098,776 B2* | 1/2012 | Kent | H04B 7/0697 | 375/141 |
| 8,111,789 B2* | 2/2012 | Kent | H04L 25/0204 | 342/377 |
| 8,422,540 B1* | 4/2013 | Negus | H04B 1/38 | 370/210 |
| 8,442,099 B1* | 5/2013 | Sederat | H04B 3/30 | 375/219 |
| 8,520,784 B1* | 8/2013 | Lackey | H04B 7/0619 | 375/284 |
| 8,571,154 B1* | 10/2013 | Lackey | H04B 7/0837 | 375/284 |
| 8,665,938 B2* | 3/2014 | Yu | H04W 24/10 | 375/220 |
| 8,744,336 B2* | 6/2014 | Patel | H04B 1/1027 | 455/1 |
| 8,792,540 B2* | 7/2014 | Shih | H03F 3/45 | 375/221 |
| 8,897,735 B2* | 11/2014 | Kim | H04B 1/525 | 375/148 |
| 8,995,594 B2* | 3/2015 | Kesling | H04B 1/38 | 375/220 |
| 9,014,315 B1* | 4/2015 | Hogerheiden, Jr. | H04B 1/525 | 375/346 |
| 9,031,521 B2* | 5/2015 | Yang | H03F 1/3247 | 375/296 |
| 9,066,368 B2* | 6/2015 | Lorenz | H04W 88/02 | |
| 9,203,448 B2* | 12/2015 | Morita | H04B 1/0475 | |
| 9,203,462 B2* | 12/2015 | Petrovic | H04B 1/123 | |
| 9,331,737 B2* | 5/2016 | Hong | H04B 1/56 | |
| 9,337,886 B1* | 5/2016 | Dick | H04B 1/0475 | |
| 9,413,400 B1* | 8/2016 | Hedayati | H04B 1/1027 | |
| 9,641,309 B2* | 5/2017 | Ko | H04L 5/0073 | |
| 9,698,860 B2* | 7/2017 | Bharadia | H04B 1/525 | |
| 9,774,405 B2* | 9/2017 | Bharadia | H04B 15/00 | |
| 9,832,003 B2* | 11/2017 | Bharadia | H04L 5/1438 | |
| 9,844,061 B2* | 12/2017 | Shattil | H04B 7/0456 | |
| 9,859,992 B1* | 1/2018 | Hogerheiden | H04B 15/06 | |
| 2004/0132470 A1* | 7/2004 | Checoury | H04L 27/368 | 455/501 |
| 2006/0055594 A1* | 3/2006 | McConnell | G01S 19/21 | 342/357.59 |
| 2007/0217488 A1* | 9/2007 | Smaini | H04B 1/525 | 375/219 |
| 2008/0089397 A1* | 4/2008 | Vetter | H04B 1/525 | 375/220 |
| 2008/0159435 A1* | 7/2008 | Cohen | H03F 1/3247 | 375/297 |
| 2008/0219671 A1* | 9/2008 | Schmitt | H04B 10/1149 | 398/130 |
| 2009/0232260 A1* | 9/2009 | Hayashi | G01S 7/038 | 375/346 |
| 2010/0135439 A1* | 6/2010 | Lackey | H04B 1/525 | 375/344 |
| 2010/0135443 A1* | 6/2010 | Lackey | H03D 1/04 | 375/346 |
| 2010/0136926 A1* | 6/2010 | Lackey | H04B 1/126 | 455/78 |
| 2010/0136941 A1* | 6/2010 | Lackey | H04B 1/525 | 455/307 |
| 2010/0159837 A1* | 6/2010 | Dent | H04B 1/525 | 455/63.1 |
| 2011/0263195 A1* | 10/2011 | Nightingale | H04B 1/525 | 455/1 |
| 2013/0094550 A1* | 4/2013 | Coan | H03F 1/3247 | 375/222 |
| 2013/0102254 A1* | 4/2013 | Cyzs | H04B 1/126 | 455/63.1 |
| 2014/0241282 A1* | 8/2014 | Mueller | H04B 7/18506 | 370/329 |
| 2014/0250325 A1* | 9/2014 | Mege | H04L 1/1819 | 714/18 |
| 2015/0171903 A1* | 6/2015 | Mehlman | H04B 1/10 | 375/346 |
| 2015/0280887 A1* | 10/2015 | Ko | H04B 1/525 | 370/330 |
| 2015/0318976 A1* | 11/2015 | Eltawil | H04B 1/123 | 370/278 |
| 2016/0182105 A1* | 6/2016 | Alavi | H04B 1/525 | 455/78 |
| 2016/0226653 A1* | 8/2016 | Bharadia | H04B 1/525 | |
| 2016/0294425 A1* | 10/2016 | Hwang | H04B 1/525 | |
| 2016/0373234 A1* | 12/2016 | Ju | H04L 5/14 | |
| 2016/0380669 A1* | 12/2016 | Liu | H04B 1/525 | 375/219 |
| 2017/0005773 A1* | 1/2017 | Liu | H04B 1/525 | |
| 2017/0019239 A1* | 1/2017 | Jin | H04L 1/004 | |
| 2017/0054545 A1* | 2/2017 | Negus | H04L 5/1423 | |
| 2017/0085398 A1* | 3/2017 | Liu | H04L 5/0048 | |
| 2017/0111155 A1* | 4/2017 | Liu | H04L 5/0055 | |
| 2017/0170948 A1* | 6/2017 | Eltawil | H04L 5/1461 | |
| 2017/0179983 A1* | 6/2017 | Choi | H04B 1/0475 | |
| 2017/0180166 A1* | 6/2017 | Zhou | H04L 25/03885 | |
| 2017/0187513 A9* | 6/2017 | Bharadia | H04L 5/1461 | |
| 2017/0244445 A1* | 8/2017 | Jin | H04B 3/23 | |
| 2017/0339569 A1* | 11/2017 | Khandani | H04W 12/04 | |
| 2017/0353202 A1* | 12/2017 | Gagey | H04B 1/12 | |
| 2017/0353203 A1* | 12/2017 | Gagey | H04B 1/1036 | |
| 2017/0353212 A1* | 12/2017 | Bharadia | H04B 1/525 | |
| 2018/0006672 A1* | 1/2018 | Choi | H04B 1/0475 | |

\* cited by examiner

DEVICE AND METHOD FOR PROCESSING A SIGNAL RECEIVED BY A RECEIVER DISRUPTED BY A TRANSMITTER

CROSS-REFERENCE TO RELATED APPLICATIONS

This application claims priority to French Patent Application No. 1655130, filed Jun. 6, 2016, the entire content of which is incorporated herein by reference in its entirety.

FIELD

The field of invention relates to systems processing interference between different co-located radiocommunication systems in order to reduce or eliminate them. To this end, the field of the invention relates to the elimination of interference by application of an analogue correction and a digital correction. The invention relates to a device and a method to reduce the intensity of an interfering signal present in a received signal.

BACKGROUND

When two radio devices are placed in proximity they can interfere, which leads to a degradation of the quality of the communications. More specifically, the signal transmitted by a transmitter, also called a "direct" signal or "interfering" signal, is superimposed on the "wanted" signal received by a receiver.

Due to the proximity between the two devices the direct signal is very intense compared to the wanted signal, which contains the data which must be received by the receiver.

The interference between two devices is due principally to two effects.

Due to the fact that the signal transmitted by the transmitter is very intense in the receiver's antenna its amplifiers may be saturated. This effect, which is also known as desensitisation of the receiver, may occur even if the carrier of the transmitter device is outside the receiver band of the receiver device.

The second effect is due to the broadband noise which is associated with the direct signal. This broadband noise may be due, in particular, to the non-linearities of the various modules present in the transmitter. This broadband noise may cover, totally or partially, the frequency receiver band of the second device.

The interference is particularly substantial when the frequency band of the transmitter is close to the frequency band of the receiver, or when both frequency bands are coincidental.

One of the solutions known to those skilled in the art to reduce the intensity of the interfering signal is to use radio-frequency filters, or RF filters.

Nevertheless, these solutions prove to be impractical due to the fact that it is necessary to choose specific RF filters for each transmitter/receiver band, or non-applicable when the transmission and reception use the same frequency band. In addition, RF filters produced insertion losses which can reduce the power of the transmitted signal when they are used in transmitters, and the sensitivity of the receiver device when they are used in receivers.

Other solutions known to those skilled in the art relate to the physical elimination of the interference by subtraction or compensation of the interfering signal. These methods are based on an analogue subtraction of a reference signal from the received signal in order to recover the wanted signal exclusively.

The reference signal can be obtained by making an analogue copy of the transmitted signal, and by transmitting its amplitude and phase using an analogue processing circuit.

This analogue correction process is very effective to eliminate the effects of desensitisation of the receiver, and enables saturation of the receiver device to be prevented. However, this analogue correction process is effective only if the analogue copy of the transmitted signal is sufficiently well time-synchronised with the interference which must be eliminated. In addition, the solutions known to those skilled in the art do not enable allowance to be made for the distortions of the reference signal introduced by the analogue processing circuit.

Certain systems, also known to those skilled in the art, enable digital processing of the interference to be accomplished in the band of the receiver device. In a general sense this processing enables the signals to be combined by accomplishing more complex operations which would not be possible with analogue processing.

In this case the reference signal is a digital signal taken in the transmitter device before being converted into analogue format, an operation which occurs prior to transmission.

However, since the digital reference signal is taken before it is converted into an analogue signal, these solutions are unable to take into account the non-linearities of the amplification chain of the transmitter device. These non-linearities are at least partly responsible for the broadband noise observed in the reception channel.

SUMMARY

To remedy these difficulties a first aspect of the present invention relates to a device to process a signal received by a receiver disrupted by a transmitter, where the transmitter and receiver are co-located, and where the device is characterised by the fact that it includes:
- a first coupler configured to take a first reference signal from an interfering signal transmitted by the transmitter, where the first reference signal is taken after the amplification chain connected to the transmitter's antenna;
- an analogue circuit to process the first reference signal delivering a modified reference signal, where the analogue processing circuit modifies at least one of the parameters, including: the amplitude and/or phase and/or time lag of the first reference signal, where the modified reference signal is able to compensate for the interfering signal transmitted by the transmitter present in the signal received by the receiver;
- a second coupler configured to combine the modified reference signal with the signal received by an antenna of the receiver, delivering the combined signal to a second analogue-to-digital conversion module;
- a first analogue-to-digital conversion module digitising the first reference signal in order to deliver to a signal-processing digital device a first digital reference signal;
- the second analogue conversion module digitising the combined signal in order to deliver a digital combined signal to the digital signal-processing device, where the signal-processing device combines the digital combined signal and at least the first digital reference signal in order to reduce the intensity of the interfering signal present in the digital combined signal, where the signal-processing device delivers a resulting digital signal to a data-processing module of the receiver device.

The term "radio transmitter" is understood to mean a radio signal transmission module connected to an antenna.

The term "radio receiver" is understood to mean a radio signal reception module connected to an antenna.

The term "co-located receiver and transmitter" is understood to mean two devices positioned in proximity to one another. When a transmitter and a receiver are co-located the signal transmitted by the transmitter interferes with the wanted signal received by the receiver. The signal received by the receiver is therefore a combination of the interfering signal transmitted by the transmitter and the wanted signal. For example, a transmitter and a receiver positioned on the roof of the same vehicle are co-located in the sense of the invention.

The co-located transmitter and receiver can, for example, be positioned on two different radio devices, or be positioned on the same device.

The transmitter and receiver can be connected to the same antenna.

The term "interfering signal" is understood to mean the signal transmitted by the antenna of the transmitter and received by the antenna of the receiver.

The term "signal received by the receiver" is understood to mean the signal comprising the superimposition of a wanted signal and of the interfering signal.

The term "wanted signal" is understood to mean the signal containing the data intended for the radio device equipped with the receiver.

The term "analogue processing circuit" is understood to mean a circuit capable of modifying the phase and/or amplitude and/or time lag of the signal when it is received. In embodiments of the present invention the signal received in the analogue circuit is a copy of the interfering signal.

The term "coupler configured to combine the first reference signal with the received signal" is understood to mean, for example, a circuit capable of totalling the two signals.

The term "analogue-to-digital conversion module" is understood to mean a set of circuits capable of digitising a received analogue signal. In a particular embodiment of the present invention such an analogue-to-digital conversion module includes at least one analogue-to-digital converter, at least one low-pass filter and at least one mixer to split the received signals into basebands. For example, such an analogue-to-digital conversion module delivers at its output both baseband components of the incoming signal.

The term "digital signal-processing device" is understood to mean a device capable of accomplishing mathematical operations on digital signals, for example using at least one microprocessor. A digital processing device in the sense of the invention may be integrated in a computer or any other digital computation device. In the case of the invention this digital signal-processing device may, for example, minimise the distance between the digital combined signal and the digital reference signal in order to find the wanted signal.

In a general sense, the device according to an embodiment of the invention enables the signal received by the receiver to be processed. The received signal contains the wanted signal, formed by the data intended for the users of the receiver. In addition to the wanted signal the received signal contains the interfering signal transmitted by the first radio device. It may also include noise.

The device according to an embodiment of the invention enables the wanted signal to be extracted from the received signal, in particular by reducing the intensity of the interfering signal in the signal received by the receiver.

The interfering signal is eliminated by the device according to an embodiment of the invention using a first analogue correction and a second digital correction.

The first analogue correction is accomplished by combining the modified reference signal and the received signal. To this end, the analogue processing circuit provides the modified reference signal which is, for example, a copy of the interfering signal, taken at the output of the transmitter, with its amplitude modified such that its amplitude is equal to that of the interfering signal present in the received signal, and phase-shifted such that its phase is 180° relative to that of the interfering signal present in the received signal. The two signals are combined using the second coupler in order to compensate for the interfering signal present in the received signal.

For example, when the modified reference signal is a copy of the interfering signal, taken at the output of the transmitter, with its amplitude modified such that its amplitude is equal to that of the interfering signal present in the received signal, and phase-shifted such that its phase is 180° from that of the interfering signal present in the received signal, the second coupler totals the modified reference signal and the received signal in order to delete the interfering signal present in the received signal. The second coupler provides at its output the combined signal, i.e. the received signal to which the modified reference signal has been added.

Beneficially, the first analogue correction enables very intense signals to be manipulated, and it is particularly appropriate for preventing the phenomenon of saturation of the receiver.

Beneficially the analogue reference signal, called the first reference signal, which is used for analogue correction, is taken after the transmitter's application chain. This enables all the analogue distortions introduced by the various modules of the transmitter to be taken into account, and the digital correction to be made more effective.

The device according to an embodiment of the invention also applies a digital correction to the signal received by the second device using a digital reference signal.

The digital correction is accomplished using the digital signal-processing device. The digital signal-processing device combines the digital combined signal and at least one digital reference signal.

Beneficially, the digital correction enables complex mathematical operations to be performed by combining at least two digital signals.

Beneficially, the digital correction enables the residual interfering signal after the analogue correction to be eliminated.

Beneficially, the digital correction enables the interference due to the broadband noise of the interfering signal in the frequency band of the receiver to be eliminated if the transmission and reception frequencies are different.

Beneficially, the digital reference signal is obtained by digitising the first reference signal, which is taken at the output of the transmitter, and in particular after the transmitter's amplification chain. This enables all the analogue distortions introduced by the various modules of the transmitter to be taken into account.

For example, the digital correction can be applied by minimising by an iterative procedure the difference between the digital combined signal—i.e. the received signal to which the first analogue correction has been applied, and which has been digitised—and the digital reference signal multiplied by an adjustment parameter. This procedure enables the wanted signal to be extracted and to be transmitted to an data-processing module of the receiver.

According to an embodiment, two reference signals are used, the first digitised reference signal and the digitised modified reference signal. The digitised modified reference signal is obtained by digitising the modified reference signal taken at the output of the analogue processing circuit.

Beneficially, the digitised modified reference signal enables any distortions introduced by the analogue processing circuit of the first reference signal to be taken into account during the digital elimination of the interference.

The device for reducing the intensity of an interfering signal according to an embodiment of the invention may also have one or more of the characteristics below, considered individually or in all technically possible combinations:

- it includes a third analogue-to-digital conversion module digitising the modified reference signal in order to deliver a digital modified reference signal to the digital signal-processing device, where the modified reference signal is taken after the analogue processing circuit, where the signal-processing device combines the digital combined signal and two digital reference signals, the first digital reference signal and the digital modified reference signal, in order to reduce the intensity of the interfering signal present in the digital combined signal, where the signal-processing device delivers a resulting digital signal to a data-processing module of the receiver device;
- the receiver is a receiver of the narrow-band type the bandwidth of which is less than 10 MHz;
- at least one analogue-to-digital conversion module includes at least one of the following elements: a local oscillator, a mixer to split the incoming signal into basebands, a low-pass filter to eliminate the image frequency, and an analogue-to-digital converter to provide the digital version of the baseband components of the incoming signal;
- the analogue processing circuit includes at least one variable phase splitter and a variable gain to generate the modified reference signal;
- the analogue processing circuit also contains a fixed delay circuit and/or a configurable delay circuit to generate the modified reference signal.
- the digital signal-processing device includes at least one processor or other computation means.

Another aspect of the present invention relates to a method of implementing the device for reducing the intensity of an interfering signal, where the method includes the following steps:

- taking of a first reference signal from an interfering signal transmitted by the transmitter;
- modification of the properties of the first reference signal using an analogue circuit to obtain a modified reference signal, where the modified reference signal is able to compensate for the interfering signal transmitted by the transmitter which is present in the signal received by the receiver;
- combination of the modified reference signal and of the signal received by the receiver to obtain the combined signal;
- analogue-to-digital conversion of the combined signal to obtain the digital combined signal;
- analogue-to-digital conversion of the first reference signal to obtain a first digital reference signal, where the first reference signal is taken after the amplification chain connected to the transmitter's antenna;
- combination using the signal-processing device of the digital combined signal and of at least the first digital reference signal in order to eliminate the interfering signal present in the digital combined signal;
- transmission of the digital resulting signal to a data-processing module of the receiver device.

The method for implementing the device for reducing the intensity of an interfering signal according to an embodiment the invention may also have one or more of the characteristics below, considered individually or in all technically possible combinations:

- It includes a step of analogue-to-digital conversion of the modified reference signal to obtain a digital modified reference signal, where the modified reference signal is taken after the analogue processing circuit, where the digital combination, using the signal-processing device, of the digital combined signal, of the first digital reference signal and of the modified reference signal is accomplished in order to eliminate the interfering signal present in the digital combined signal.
- the step of combination, using the signal-processing device, of the digital combined signal and of the first digital reference signal in order to eliminate the interfering signal present in the digital combined signal includes the iterative minimisation of the difference between the digital combined signal and the first digital reference signal, in order to transmit the digital resulting signal to a data-processing module of the receiver device, where the difference to be minimised has the form $R2n - \overline{\text{Ref1}n}^T \cdot \overline{a}$, where each term of vector $\overline{\text{Ref1}n}$ represents the first digital reference signal, with a given digital time lag, and where the terms of vector $\overline{a}$ act as adjustment parameters;
- the step of combination of the digital combined signal and of the digital reference signal using the signal-processing device in order to eliminate the interfering signal present in the digital combined signal includes the iterative minimisation of the difference between the digital combined signal and the digital reference signal in order to transmit the digital resulting signal to a data-processing module (60) of the receiver device (RE), where the difference to be minimised is of the following form: expected value of $(\|R2n - \overline{\text{Ref1}n}^T \cdot \overline{a}\|^2)$, where vector $\overline{a}$ represents the adjustment parameters, and where each term of vector $\overline{\text{Ref1}n}$ represents the first digital reference signal with a given digital time lag;
- the step of combination, using the signal-processing device, of the digital combined signal of the first digital reference signal and of the digital modified reference signal in order to eliminate the interfering signal present in the digital combined signal includes the iterative minimisation of the difference between the digital sum signal, the first digital reference signal and the digital modified reference signal, in order to transmit the digital resulting signal to a data-processing module of the receiver, where the difference to be modified is of the form $R2n'' = R2n - \overline{\text{Ref1}n}^T \cdot \overline{a_1} - \overline{\text{Ref2}n}^T \cdot \overline{a_2}$, where each term of vector $\overline{\text{Ref1}n}$ represents the first digital reference signal with a given digital time lag, where the terms of vector $\overline{a_1}$ act as adjustment parameters, where each term of vector $\overline{\text{Ref2}n}$ represents the digital modified reference signal with a given digital time lag, and where the terms of vector $\overline{a_2}$ act as adjustment parameters;
- the step of combination of the digital combined signal and of the digital reference signals, using the signal-processing device, in order to eliminate the interfering signal present in the digital combined signal includes the iterative minimisation of the difference between the digital combined signal and the digital reference signals in order to transmit the digital resulting signal to a data-processing module (60) of the receiver device (RE), where the difference to be minimised is of the following form: expected value of ($\|R2n-\overline{\text{Ref1}n}^T\cdot\overline{a_1}-\overline{\text{Ref2}n}^T\cdot\overline{a_2}\|^2$), where vector $\overline{a_1}$ represents the adjustment parameters for the first digital reference signal, and where each term of vector $\overline{\text{Ref1}n}$ represents the first digital reference signal with a given digital time lag; where vector $\overline{a_2}$ represents the adjustment parameters for the modified reference signal, and where each term of vector $\overline{\text{Ref2}n}$ represents the digital modified reference signal with a given digital time lag;

iterative minimisation of the difference between the digital combined signal and at least one digital reference signal is accomplished using an algorithm of the stochastic gradient type;

the steps of analogue-to-digital conversion provide a digital representation of the baseband signals;

it includes a step of digital filtering, applied before the digital signal-processing device, of the first digital reference signal, of the digital modified reference signal, and of the digital combined signal, in order to select the frequency range corresponding to the receiver's receiver band.

Another aspect of the invention relates to a system for transmission/reception of a radio signal including at least one transmission antenna connected to a transmitter device and a reception antenna connected to a receiver device, where the transmission/reception device is characterised by the fact that it includes the device for reducing the intensity of an interfering signal in a received signal.

Another aspect of the invention relates to a device for transmission/reception of a radio signal including an antenna connected both to a transmitter device and to a receiver device, where the device is characterised by the fact that it includes a device for reducing the intensity of an interfering signal.

BRIEF DESCRIPTION OF THE DRAWINGS

Other characteristics and benefits of the invention will become clear from the description given of it below, by way of example and non-restrictively, with reference to the appended figures, in which.

DETAILED DESCRIPTION

Co-Located Transmitter and Receiver

Figure 1:
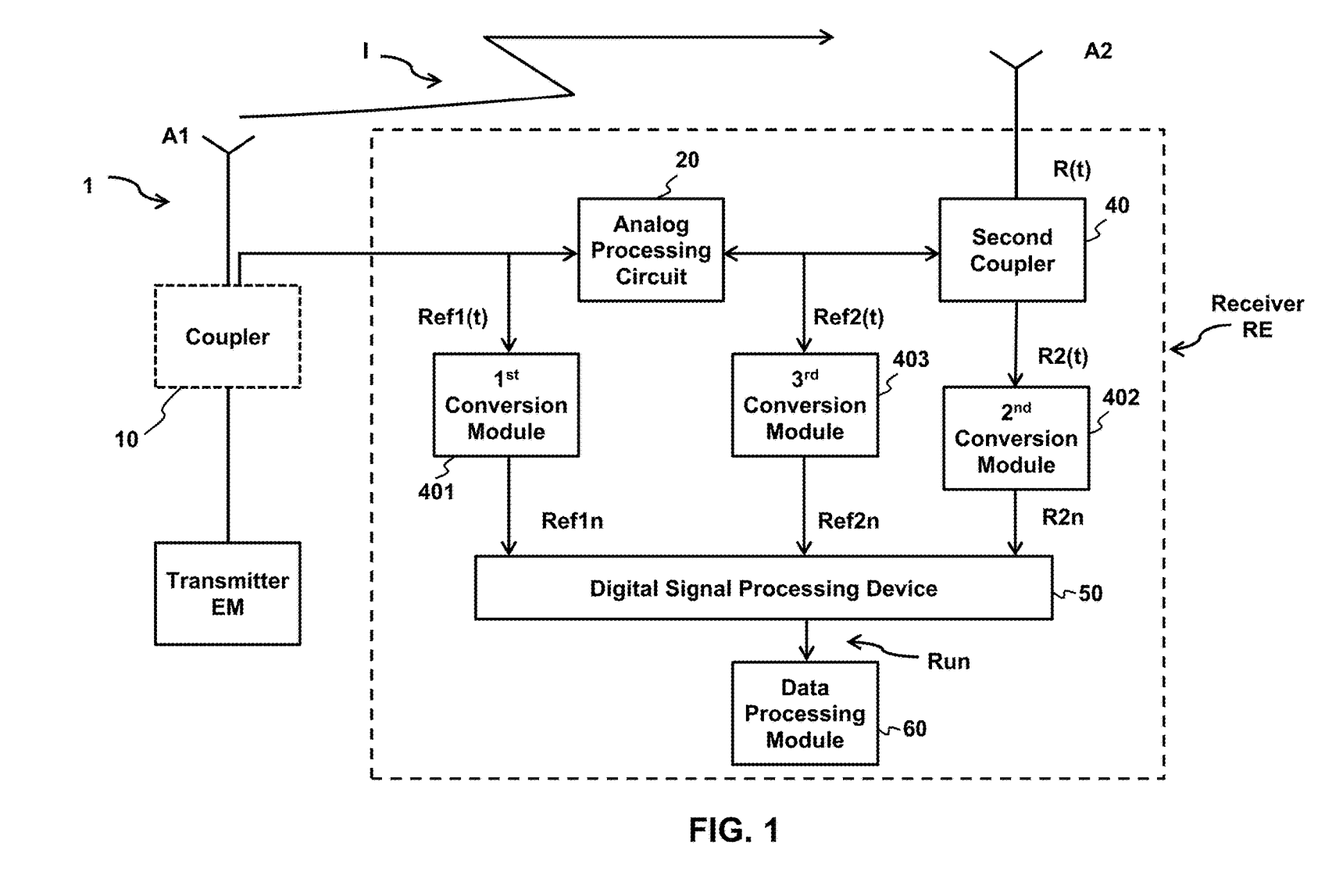
FIG. 1 illustrates the device for reducing the intensity of an interfering signal according to an embodiment of the invention.

FIG. 1 represents the device for reducing the intensity of an interfering signal in a received signal according to an embodiment of the invention;

The device according to an embodiment of the invention finds application when a transmitter EM and a receiver RE are co-located.

In such a configuration received signal R is a signal which includes the combination of the wanted signal and the signal transmitted by the transmitter. The signal transmitted by the transmitter is considered an interfering signal I.

The wanted signal contains the data intended for the users of the receiver device.

The device according to an embodiment of the invention proves of particular use in the following situations. In a first situation two radio terminals or devices are positioned in proximity. In this case the first device includes a transmitter EM connected to an antenna and the second device includes a receiver RE connected to an antenna.

Due to the proximity of the transmitter and the receiver it is possible to take a portion of the transmitted signal directly. The transmitted signal is used as a reference signal by device 1 according to an embodiment of the invention.

Device 1 according to an embodiment the invention uses the reference signal to apply an analogue correction and a digital correction to the received signal, in order to extract the wanted signal from it.

According to another embodiment, transmitter EM and receiver RE form part of the same user device.

Transmitter EM and receiver RE can either use the same radiocommunication system or use two different systems.

Figure 6A:
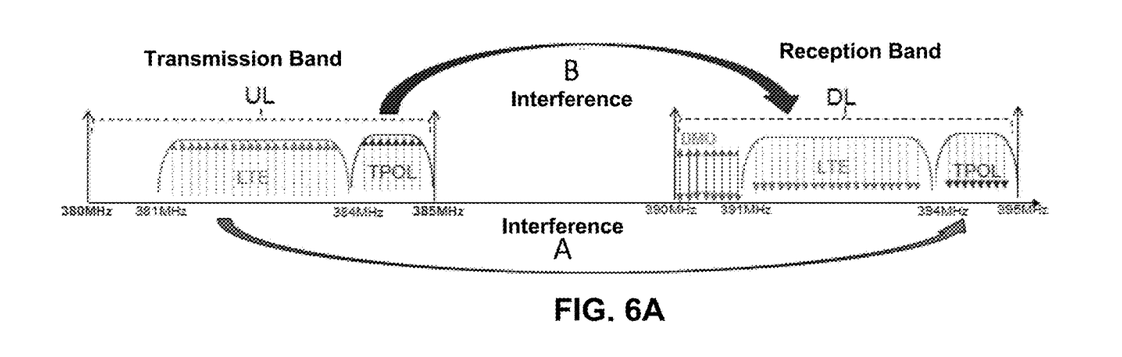
FIG. 6a illustrates an example of possible interference between two transmission devices using two different radiocommunication systems.

FIG. 6a shows transmission band UL and reception band DL for two co-located radio devices using two different communication systems. In the case illustrated in FIG. 6a one device uses a high-transmission rate system, for example an LTE system, and one device uses a system of the Tetrapol TPOL type.

In a manner known to those skilled in the art, even if the transmission/reception frequency ranges do not overlap interference effects can occur. This relates in particular to effects of desensitisation of the receiver and interference due to the broadband noise generated by the transmitter.

Arrow A of FIG. 6a represents the interference caused by transmission LTE on reception TPOL. Arrow B of FIG. 6a shows the interference caused by transmission TPOL on reception LTE.

The device according to an embodiment of the invention applies a double analogue and digital correction to the signal received by receiver RE, the aim of the correction being to reduce the intensity of the interfering signal in the received signal.

The first correction applied by device 1 according to an embodiment of the invention is an analogue correction.

Coupler 10

Coupler 10 takes a portion of the signal transmitted by transmitter EM or interfering signal I.

According to an embodiment, coupler 10 is a radio-frequency coupler or an asymmetrical power divider. Every other type of coupler known to the skilled man in the art can also be used.

The signal taken by coupler 10 is called first reference signal Ref1. First reference signal Ref1 is sent to an analogue processing circuit 20. It is also sent to a first analogue-to-digital conversion module 401.

According to an embodiment, coupler 10 is positioned after the amplification chain of transmitter EM.

According to another embodiment, the coupler is positioned before the transmission antenna connected to the transmitter.

Beneficially, coupler 10 takes first reference signal Ref1 after the amplification chain of the transmitter, which enables the broadband noise introduced by the transmitter's output modules to be taken into account.

Analogue Processing Circuit 20, Improved Delay Circuit and Coupler 40

Analogue processing circuit 20 delivers at output a modified reference signal Ref2.

According to an embodiment, modified reference signal Ref2 is a copy of the interfering signal, the amplitude and phase of which are modified opportunely.

Figure 2:
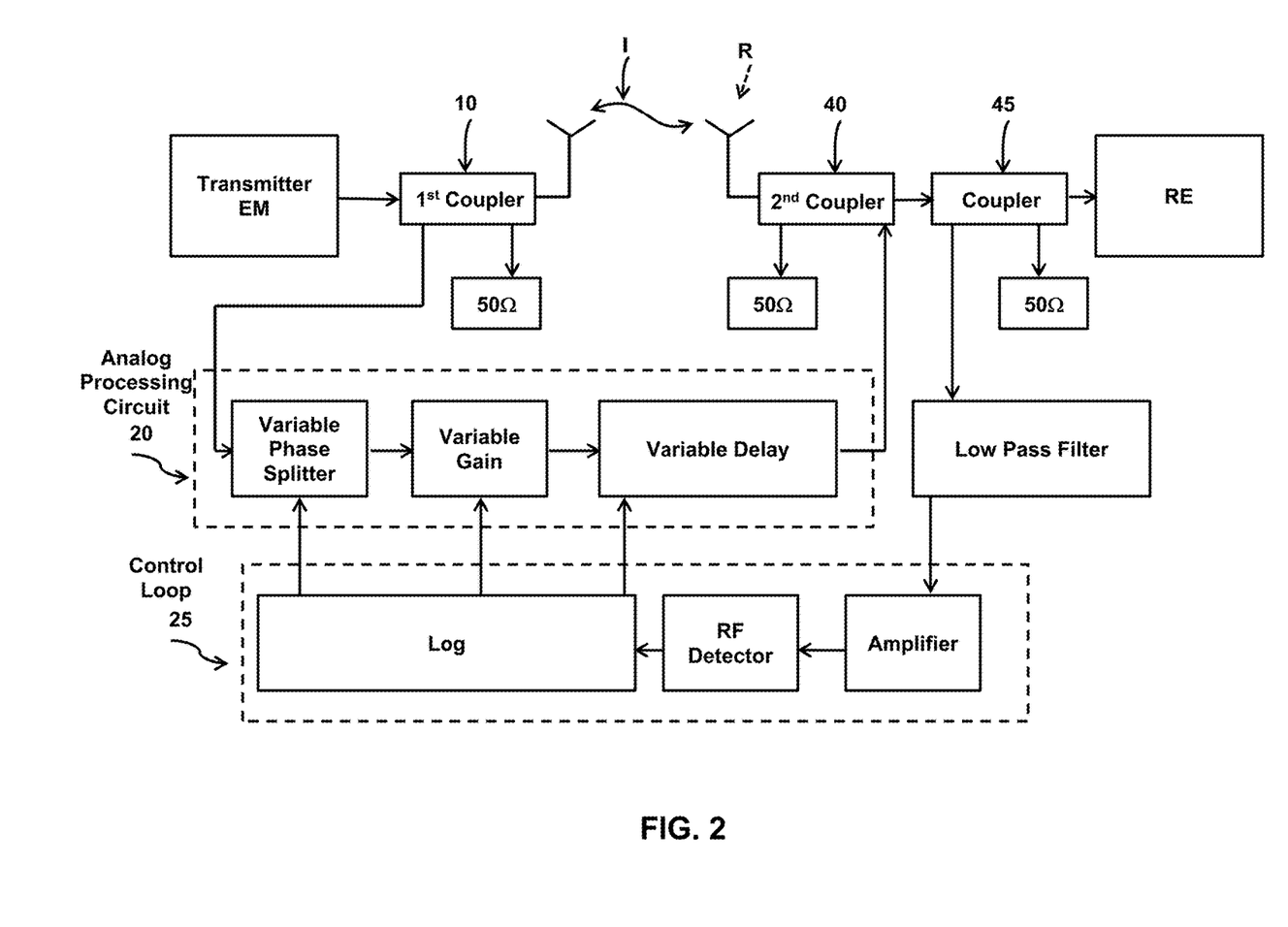
FIG. 2 illustrates a means of implementing the procedure for analogue reduction of the intensity of an interfering signal according to an embodiment of the invention.

The amplitude of modified reference signal Ref2 is modified by the variable gain circuit of FIG. 2, The variable gain circuit can either reduce the amplitude of the incoming signal, by applying a negative gain (expressed in dB), or increase the amplitude of the incoming signal by applying a positive gain (expressed in dB).

The phase of modified reference signal Ref2 is modified by the variable phase splitter circuit of FIG. 2.

According to an embodiment, analogue processing circuit 20 modifies the amplitude of the first reference signal, and dephases it such that it is at 180° relative to interfering signal I as seen in received signal R.

According to an embodiment of the invention, analogue processing circuit 20 includes an improved delay circuit according to the application "Time lag circuit of a radio-frequency signal and device for reducing interference using said circuit" filed in the name of Airbus DS SAS on Jun. 6, 2016.

For example, the improved delay circuit is a delay circuit for the time lag of an incoming radio-frequency signal, where the delay circuit includes a all-pass filter whilst having a given central frequency configured to linearise the dephasing of the output signal relative to the input signal according to the frequency over a first frequency range, and characterised by the fact that it includes a first anti-resonant circuit having a first central frequency and a second anti-resonant circuit having a second central frequency, where the all-pass filter and both the anti-resonant circuits are configured and arranged to linearise the dephasing of the output signal relative to the input signal according to the frequency over a second frequency range including the first range.

Beneficially, analogue processing circuit 20 enables the amplitude, phase and time lag of modified reference signal Ref2 to be adjusted independently.

Beneficially, analogue processing circuit 20 according to an embodiment of the invention enables, due to the improved delay circuit, a constant or quasi-constant time lag to be introduced for the receiver's reception band, which is particularly effective when the receiver is of the broadband type.

Second coupler 40 combines modified reference signal Ref2 with received signal R and delivers at output combined signal R2 in order to compensate for interfering signal I as it is seen in received signal R.

Due to the modifications of intensity and phase introduced by processing circuit 20, modified reference signal Ref2 erases at least partially interfering signal I as it is seen in received signal R. In other words, device 1 according to an embodiment of the invention reduces the intensity of interfering signal I in received signal R.

According to one particular embodiment, second coupler 40 sums modified reference signal Ref2 and received signal R.

Beneficially, when analogue processing circuit 20 modifies the amplitude of the first reference signal such that the amplitude of the modified reference signal is equal to the amplitude of interfering signal I as seen in received signal R and dephases it such that it is at 180° of signal I as seen in received signal R, the modified reference signal obtained in this manner can simply be summed with the received signal R in order to erase interfering signal I.

Combined signal R2 delivered by second coupler 20 is therefore the received signal to which a first analogue correction has been applied.

According to an embodiment, the parameters of analogue processing circuit 20 are adjusted using a control loop 25. Control loop 25 is also a loop for characterising combined signal R2.

Control loop 25 receives at input a portion of combined signal R2, taken by a coupler 45 at the output of second coupler 40.

Control loop 25 includes at least one radio-frequency amplifier, a radio-frequency power detector, and a control unit Log.

Control unit Log modifies the parameters of analogue processing circuit 20 to minimise the intensity of the interfering signal in combined signal R2.

Beneficially, control loop 25 enables the parameters of processing circuit 20 to be optimised to minimise the level of the interfering signal in combined signal R2.

Beneficially, the analogue correction using modified reference signal Ref2 enables very intense signals to be processed, which is effective in preventing the effects of saturation and desensitisation due to the interfering signal.

Figure 5:
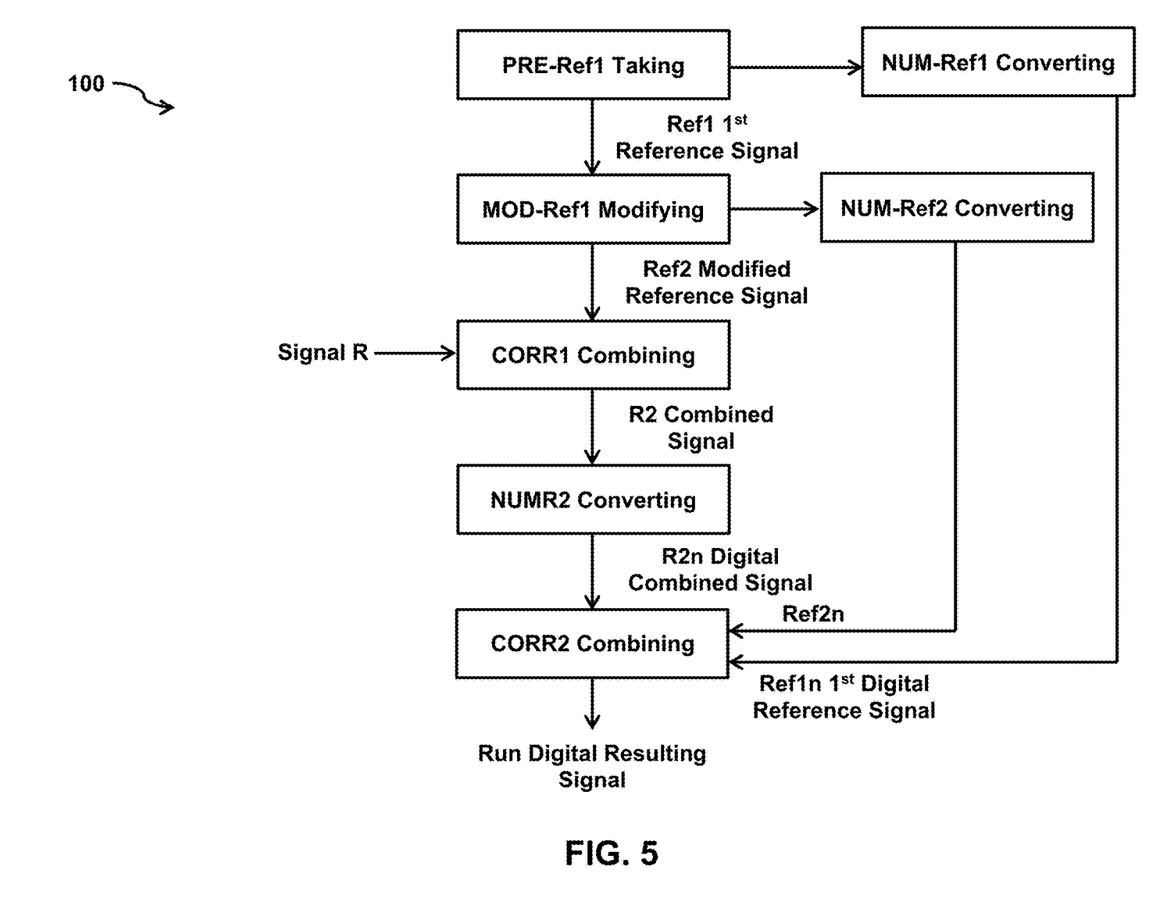
FIG. 5 illustrates a method for implementing the device for reducing the intensity of an interfering signal.

According to an embodiment, the variable delay circuit of FIG. 5 is positioned on the electrical connection connecting transmitter EM to an antenna A1.

According to an embodiment, the variable delay circuit of FIG. 5 is positioned on the electrical connection connecting receiver RE to an antenna A2.

Beneficially, the positioning of the variable delay circuit between a device and the antenna to which it is connected enables a delay to be introduced in the antenna path. This proves to be particularly effective when the antenna path is travelled more rapidly than analogue processing circuit 20 or a compensation circuit. For example, this positioning of the delay circuit is particularly beneficial when both devices EM and RE use the same antenna.

Analogue-to-Digital Conversion Module

A portion of the interfering signal can still be present in combined signal R2. This derives, for example, from the broadband noise introduced by the transmitter's amplification steps, which may have non-linear properties.

Elimination of this broadband noise and/or of the RF multipaths requires more complex mathematical operations, for which analogue processing is not effective.

To this into account, device 1 according to an embodiment of the invention applies a second correction to received signal R; this correction is digital, and is applied to combined signal R2.

First analogue-to-digital conversion module 401 delivers at output first digitised reference signal Ref1$n$.

Second analogue-to-digital conversion module 402 delivers at output combined digital signal R2$n$.

Figure 3:
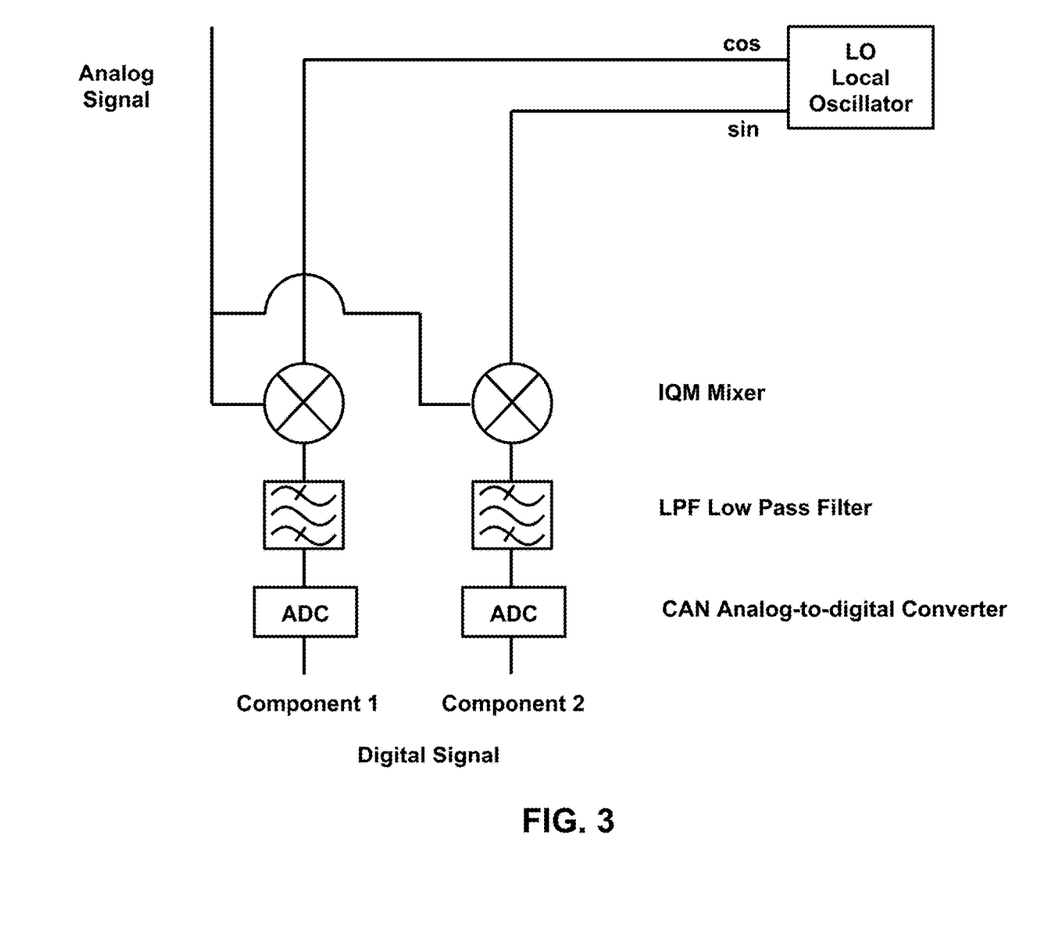
FIG. 3 illustrates an example of an analogue-to-digital conversion module.

An analogue-to-digital conversion module according to an embodiment of the invention is illustrated in FIG. 3. FIG. 3 represents the analogue-to-digital conversion into basebands of an analogue signal. This analogue-to-digital conversion module according to the above-mentioned embodiment of the invention delivers at output both baseband components of the digitised signal.

According to an embodiment, the analogue-to-digital conversion modules include at least one local oscillator LO and a mixer IQM.

Beneficially, local oscillator LO and mixer IQM enable a representation of the signal as basebands to be obtained.

According to an embodiment, conversion modules 401, 402 also include at least one low-pass filter LPF.

Beneficially, low-pass filters LPF enable the image frequency to be filtered.

Analogue-to-digital conversion modules 401, 402 also include at least one analogue-to-digital converter CAN, in order to deliver at output the digital version of the input signal.

According to an embodiment, the analogue-to-digital converters deliver the digitised baseband components of the input signal.

[Digital Signal-Processing Device 50 and Digital Correction]

Digital signal-processing device 50 receives at input one or more digital reference signals and combined digital signal R2n.

Figure 4:
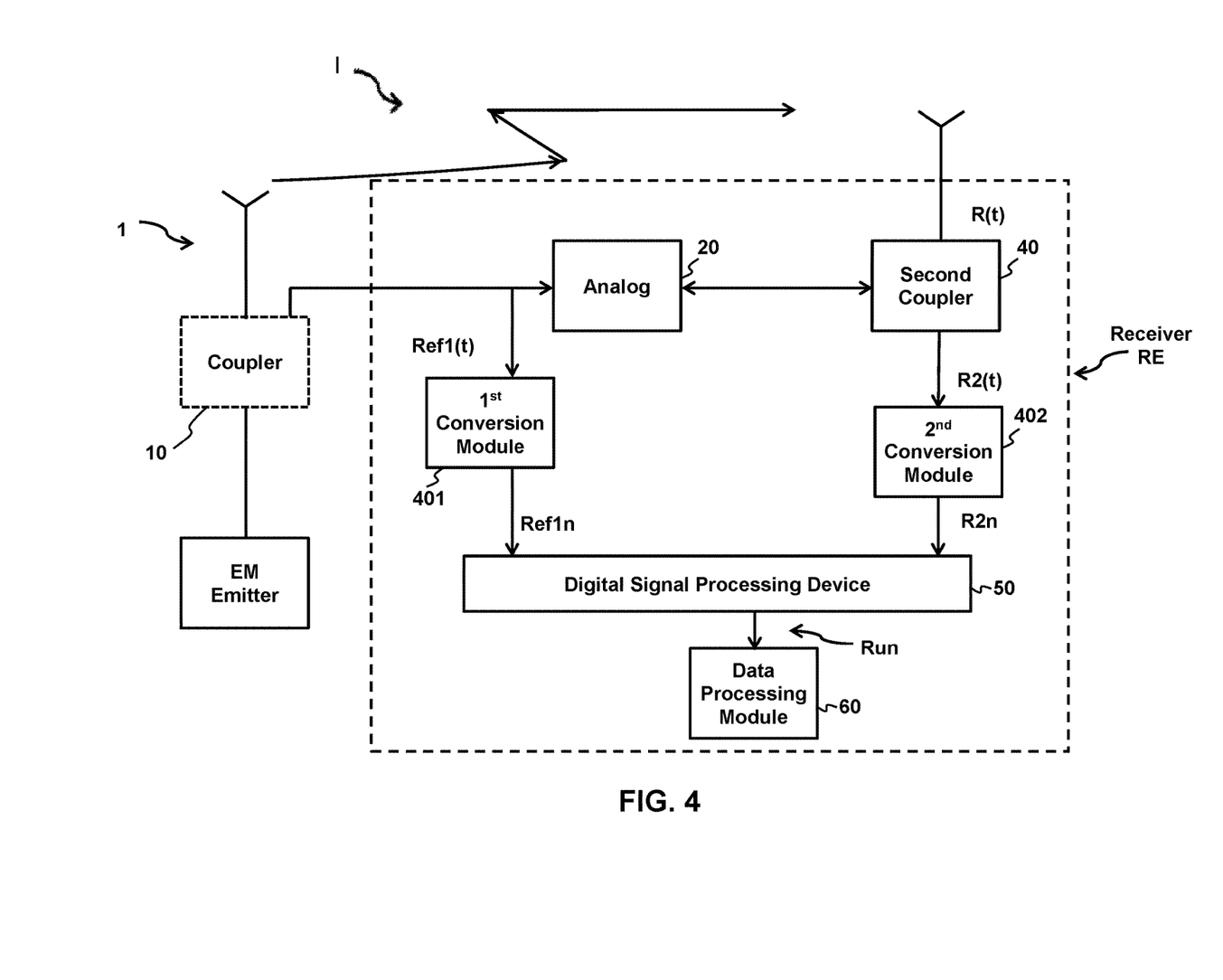
FIG. 4 illustrates an embodiment of the device according to the invention.

According to an embodiment, illustrated in FIG. 4, there is a single digital reference signal which is first digital reference signal Ref1n. First digital reference signal Ref1n is obtained by digitising first reference signal Ref1 taken after the amplification chain of transmitter EM.

Beneficially, this embodiment enables the broadband noise introduced by the non-linearities of the transmitter's amplification chain to be taken into account in digitised signal Ref1n.

According to an embodiment, illustrated in FIG. 1, two digital reference signals are used, first digital reference signal Ref1n and digital modified reference signal Ref2n.

A benefit of this embodiment is that the distortions introduced by analogue processing circuit 20, which can prevent a complete correction of the broadband noise present in the received signal, and which can mask or disrupt the wanted signal, are taken into account in the digital modified reference signal According to an embodiment, illustrated in FIG. 4, digital signal-processing device 50 combines digital combined signal R2n and first digital reference signal Ref1n to reduce the intensity of interfering signal I and to provide resulting signal Ru, for example in its digital form Run, to a data-processing device of the receiver.

According to an embodiment, digital signal-processing device 50 minimises difference $R2n'=R2n-\overline{Ref1n}^T \cdot \overline{a}$. Each term of vector $\overline{Ref1n}$ represents the first digital reference signal with a given digital time lag. For each successive term of vector $\overline{Ref1n}$ the corresponding time lag is higher than that of the previous term. The terms of vector $\overline{a}$ act as adjustment parameters, Quantity $\overline{Ref1n}^T \cdot \overline{a}$ is therefore the first digital reference signal passed through a digital filter, the coefficients of which are the terms of vector $\overline{a}$. It should be noted that there can be only a single term in vector $\overline{Ref1n}$.

The terms of vector $\overline{a}$ can, for example, be determined using an iterative procedure for the minimisation of R2n'.

When the iterative procedure has been completed R2n' represents resulting digital signal Run, which is an approximation of the digitised wanted signal, obtained by device 1 by reducing the intensity of interfering signal I in received signal R with a double analogue and digital correction.

According to this embodiment, the device for digital processing of the signals minimises quantity $R2n'=R2n-\overline{Ref1n}^T \cdot \overline{a}$.

For example, the quantity to be minimised may be the expected value of $\|R2n-\overline{Ref1n}^T \cdot \overline{a_1}\|^2$, Each term of vector $\overline{Ref1n}$ represents the first digital reference signal with a given digital time lag. For each successive term of vector $\overline{Ref1n}$ the corresponding time lag is higher than that of the previous term. The terms of vector a act as adjustment parameters. Quantity $\overline{Ref1n}^T \cdot \overline{a}$ is therefore the first digital reference signal passed through a digital filter, the coefficients of which are the terms of vector $\overline{a}$. It should be noted that there can be only a single term in vector $\overline{Ref1n}$.

The terms of vector $\overline{a}$ can, for example, be determined using an iterative procedure for the minimisation of R2n'.

According to a particular embodiment, R2n' can be minimised by using an algorithm of the stochastic gradient type.

Beneficially, this embodiment enables a digital correction to be applied to combined signal R2, to which a first analogue correction had been applied.

Beneficially, the second correction, which is a digital correction, enables the broadband noise associated with the interfering signal to be eliminated in the wanted signal's band.

Beneficially, the digital correction enables the wanted signal present in the received signal to be extracted, in order to send it to a data-processing module 60 of the receiver.

According to an embodiment, digital signal-processing device 50 contains at least one microprocessor.

According to an embodiment, digital signal-processing device 50 may be inserted in a computer or in any other computation device.

According to a particular embodiment, two reference signals are used, first digital reference signal Ref1n and digital modified reference signal Ref2n.

According to this embodiment, a third analogue-to-digital conversion module 403 provides digital modified signal Ref2n.

According to this embodiment, the device for digital processing of the signals minimises quantity $R2n''=R2n-\overline{Ref1n}^T \cdot \overline{a1}-\overline{Ref2n}^T \cdot \overline{a2}$.

For example, the quantity to be minimised may be the expected value of $\|R2n-\overline{Ref1n}^T \cdot \overline{a_1}-\overline{Ref2n}^T \cdot \overline{a_2}\|^2$. Each term of vector $\overline{Ref1n}$ represents the first digital reference signal with a given digital time lag. For each successive term of vector $\overline{Ref1n}$ the corresponding time lag is higher than that of the previous term. The terms of vector $\overline{a_1}$ act as adjustment parameters. Quantity $\overline{Ref1n}^T \cdot \overline{a_1}$ is therefore the first digital reference signal passed through a digital filter, the coefficients of which are the terms of vector $\overline{a_1}$. It should be noted that there can be only a single term in vector $\overline{Ref1n}$. Each term of vector $\overline{Ref2n}$ represents the digital modified reference signal with a given digital time lag. For each successive term of vector $\overline{Ref2n}$ the corresponding time lag is higher than that of the previous term. The terms of vector $\overline{a_2}$ act as adjustment parameters. Quantity $\overline{Ref2n}^T \cdot \overline{a_2}$ is therefore the digital modified reference signal passed through a digital filter the coefficients of which are the terms of vector $\overline{a_2}$. It should be noted that there can be only a single term in vector $\overline{Ref2n}$.

According to a particular embodiment, the values of parameters $\overline{a1}$ and $\overline{a2}$ can be determined by means of an iterative procedure for minimisation of quantity R2n''(t).

It is also possible to concatenate vectors $\overline{a1},\overline{a2}$ in vector $\overline{a}$ and vectors $\overline{Ref1n},\overline{Ref2n}$ in vector $\overline{Ref2n}$ and to rewrite the quantity $R2n''=R2n-\overline{Refn}^T \cdot \overline{a}$.

Signal R2n" represents digital resulting signal Run, which is an approximation of the digitised wanted signal. Digital resulting signal Run is the signal sent to a data-processing device 60 of receiver RE.

Another aspect of the present invention is a method 100 of implementing device 1 for reducing the intensity of an interfering signal in a received signal. Method 100 is illustrated in FIG. 5.

The first step of method 100 is taking PRE-Ref1 of a reference signal Ref1 from interfering signal I transmitted by transmitter EM.

This step is accomplished with the assistance, for example, of coupler 10 positioned after the amplification chain of transmitter EM.

Beneficially, this step enables the broadband noise generated by transmitter EM to be included in signal Ref1.

The second step of method 100 is modification MOD-Ref1 of the properties of first reference signal Ref1 using an analogue circuit 20, to obtain a modified reference signal Ref2, where the modified reference signal Ref2 is able to compensate for interfering signal I transmitted by the transmitter which is present in signal R received by receiver RE.

This step enables reference signal Ref2, used to compensate for the interfering signal present in the received signal, to be prepared.

According to a particular embodiment of step MOD-Ref1, the properties of modified reference signal Ref2 are determined by control loop 25 of FIG. 2

Beneficially, control loop 25 measures the level of the interfering signal in the received signal.

Also in FIG. 2, in block 20 control loop 25 modifies the phase, time lag and amplitude of the modified reference signal in order to reduce the intensity of the interfering signal in combined signal R2.

Step CORR1 of method 100 according to an embodiment of the invention includes the analogue combination of modified reference signal Ref2 and of received signal R by the receiver to obtain combined signal R2.

Beneficially, this step constitutes the analogue correction applied to received signal R and delivers combined signal R2.

For example, if the modified reference signal is a copy of interfering signal I, with an amplitude close to that of the interference as seen in received signal R, and with a phase shift close to 180° relative to the interference as seen in received signal R, by summing received signal R and modified reference signal Ref2 the intensity of interfering signal I present in R is significantly reduced in combined signal R2.

Steps NUM-R2 and CORR2 enable a second digital correction to be applied to combined signal R2.

Step NUM-R2 includes the analogue-to-digital conversion of combined signal R2 to obtain digital combined signal R2n. Digital conversion is accomplished using analogue-to-digital conversion module 402.

Step CORR2 is accomplished using a digital signal-processing device, and includes the digital combination of a digital reference signal, including at least first digital reference signal Ref1n, and of digital combined signal R2n, in order to minimise the intensity of interfering signal I in digital combined signal R2n.

Step CORR2 represents the application of the second correction to combined signal R2n. This second correction is a digital correction.

According to a particular embodiment, the digital reference signal is the first digital reference signal, the first reference signal being digitised during step NUMRef1 of method 100.

According to an embodiment, method 100 includes a step NUM-Ref2 of digitisation of modified reference signal Ref2 to obtain digital modified reference signal Ref2n.

According to another embodiment, two reference signals are used, first digital reference signal Ref1n and digital modified reference signal Ref2n.

Beneficially, digital signal Ref2n enables the distortions introduced by analogue processing circuit 20 to be taken into account, and more effective digital correction to be implemented.

According to a embodiment, step CORR2 is accomplished by minimising difference $R2n - \overline{Ref1n}^T \cdot \overline{a}$, where vector $\overline{a}$ represents the adjustment parameters.

According to an embodiment, during step CORR2 of method 100 the minimised quantity is the expected value of:

$$\|R2n - \overline{Ref1n}^T \cdot \overline{a}\|^2$$

Beneficially, this embodiment enables an optimal combination of R2n and Refn to be found for the extraction of wanted signal Ru, and therefore application of the digital correction to be optimised.

According to another embodiment, step CORR2 is accomplished by minimising difference:

$$R2n'' = R2n - \overline{Ref1n}^T \cdot \overline{a1} - \overline{Ref2n}^T \cdot \overline{a2}.$$

According to one embodiment, during step CORR2 of method 100 the minimised quantity is the expected value of $$\|R2n - \overline{Ref1n}^T \cdot \overline{a1} - \overline{Ref2n}^T \cdot \overline{a2}\|^2$$

Beneficially, this embodiment enables an optimal combination of R2n, Ref1n and Ref2n to be found for the extraction of wanted signal Ru and therefore application of the digital correction to be optimised.

Beneficially, the digital filtering applied to signal Ref1n, corresponding to term $\overline{Ref1n}^T \cdot \overline{a}_1$, respectively the digital filtering applied to signal Ref2n and corresponding to term $\overline{Ref2n}^T \cdot \overline{a}_2$, enables the residual time lags between the residual interference as it is seen in combined signal R2n and first digital reference signal Ref1n, respectively digital modified reference signal ref2n, to be corrected. It also enables the effect of propagation multipaths between the antennae to be taken into account and to be corrected.

At output from step CORR2 the resulting signal is sent to a data-processing module 60 of receiver RE.

Figure 6B:
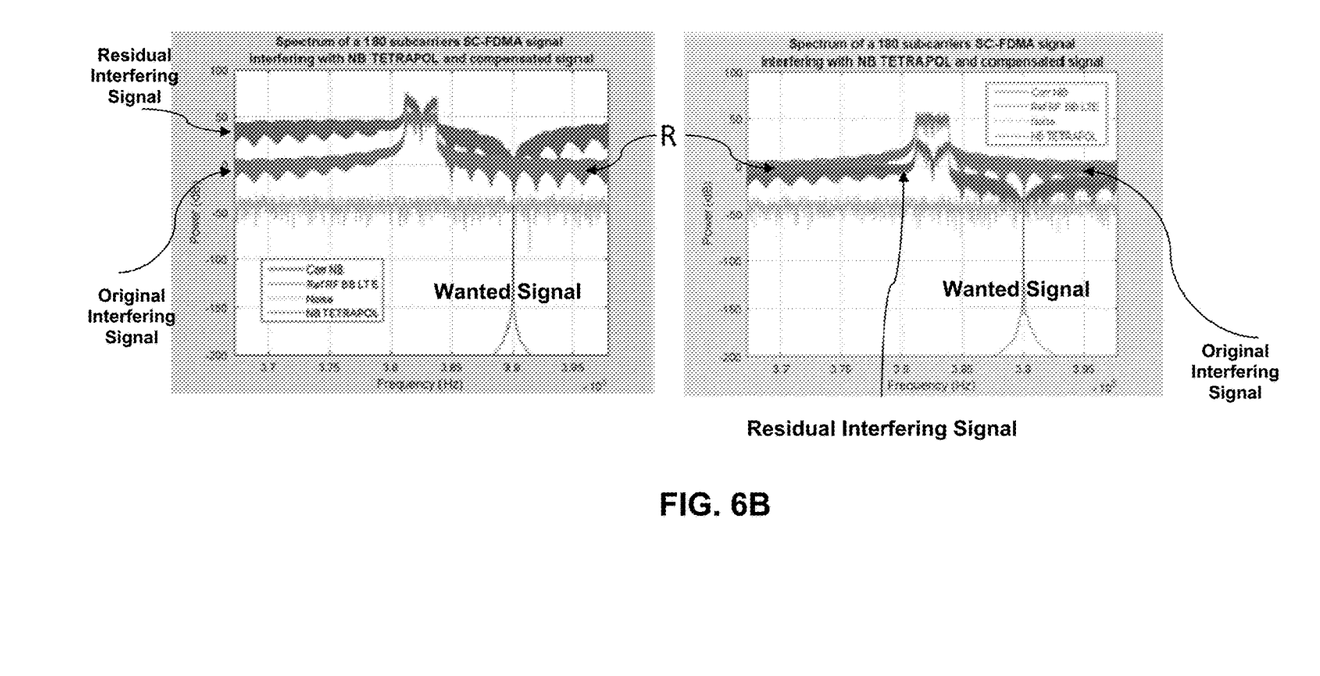
FIG. 6b illustrates an example application of the digital correction according to an embodiment of the invention.

An example of the application of digital correction according to an embodiment of the invention is illustrated in FIG. 6b. FIG. 6b shows interfering signal I as it is seen in combined signal R2, therefore at the input of the digital correction ("Original interfering signal"), the residual interfering signal after digital correction, which is present in resulting signal Ru ("Residual interfering signal"), and the wanted signal present in resulting signal Ru ("Wanted signal").

The left-hand part shows the "residual interfering signal" after several iterations of digital correction. The right-hand figure shows the "residual interfering signal" after convergence of the digital correction.

FIG. 6b represents the application of digital correction using an iterative procedure implemented by digital signal-processing device 50. It is clear that, after convergence, the wanted signal in the frequency band of the receiver is smaller compared to the initial situation, and compared to the situation after only several iterations. In addition, in the receiver's frequency band, the level of the interfering signal is reduced to the level of the thermal noise present in received signal R.

According to an embodiment, method 100 according to an the invention also includes a step of digital filtering, applied before digital correction processing 50 of first digital reference signal Ref1n, of digital modified reference signal Ref2n, if it is used, and of digital combined signal R2n, in order to select the frequency range corresponding to the receiver band of receiver RE.

Beneficially, this step enables the application of digital correction to the reception band of the wanted signal to be restricted.

An embodiment of the invention also relates to a terminal or device for transmission/reception of a radio signal including at least one transmission antenna connected to a transmitter device and a reception antenna connected to a receiver device, where the transmission/reception device is characterised by the fact that it includes device for reducing intensity 1 of an interfering signal.

Another aspect of the invention is a terminal or device for transmission/reception of a radio signal including an antenna connected both to a transmitter device and to a receiver device, where the device is characterised by the fact that it includes a device for reducing intensity 1 of an interfering signal.

The invention claimed is:

1. A device for processing a signal received by a receiver disrupted by a transmitter, wherein said transmitter and receiver are co-located, wherein said device comprises:
   a first coupler configured to take a first reference signal from an interfering signal transmitted by the transmitter, wherein the first reference signal is taken after an amplification chain connected to a transmitter's antenna;
   an analogue circuit to process the first reference signal delivering a modified reference signal, wherein the analogue processing circuit modifies at least one of the parameters, including: the amplitude and/or phase and/or time lag of the first reference signal, wherein the modified reference signal is able to compensate for the interfering signal transmitted by the transmitter present in the signal received by the receiver;
   a second coupler configured to combine the modified reference signal with the signal received by an antenna of the receiver, delivering the combined signal to a second analogue-to-digital conversion module;
   a first analogue-to-digital conversion module digitising the first reference signal in order to deliver to a signal-processing digital device a first digital reference signal, said signal-processing digital device being comprised in the device for processing a signal received; and
   the second analogue-to-digital conversion module digitising the combined signal in order to deliver a digital combined signal to the digital signal-processing device, wherein the signal-processing device combines the digital combined signal and at least the first digital reference signal in order to reduce the intensity of the interfering signal present in the digital combined signal, wherein said signal-processing device delivers a resulting digital signal to a data-processing module of the receiver device.

2. The device according to claim 1, further comprising a third analogue-to-digital conversion module configured to digitise the modified reference signal in order to deliver a digital modified reference signal to the digital signal-processing device, wherein said modified reference signal is taken after the analogue processing circuit, wherein the signal-processing device combines the digital combined signal and two digital reference signals, the first digital reference signal and the digital modified reference signal, in order to reduce the intensity of the interfering signal present in the digital combined signal, wherein said signal-processing device delivers a resulting digital signal to a data-processing module of the receiver device.

3. The device according to claim 1, wherein the receiver is a receiver of the narrow-band type the bandwidth of which is less than 10 MHz.

4. The device according to claim 1, wherein at least one analogue-to-digital conversion module includes at least one of the following elements: a local oscillator, a mixer to split the incoming signal into basebands, a low-pass filter to eliminate the image frequency, and an analogue-to-digital converter to provide the digital version of the baseband components of the incoming signal.

5. The device according to claim 1, wherein the analogue processing circuit includes at least one variable phase splitter and a variable gain to generate the modified reference signal.

6. The device according to claim 5, wherein the analogue processing circuit also contains a fixed delay circuit and/or a configurable delay circuit to generate the modified reference signal.

7. The device according to claim 1, wherein the digital signal-processing device includes at least one processor or other computation device.

8. A method for implementation of a device for processing a signal received by a receiver disrupted by a transmitter, wherein said transmitter and receiver are co-located, the method comprising:
   taking, by a first coupler, a first reference signal from an interfering signal transmitted by the transmitter, wherein said first reference signal is taken after an amplification chain connected to the transmitter's antenna;
   modifying the properties of the first reference signal using an analogue processing circuit, to obtain a modified reference signal, wherein at least one of the modified properties includes the amplitude, phase, and/or time lag of the first reference signal, wherein said modified reference signal is able to compensate for the interfering signal transmitted by the transmitter which is present in the signal received by the receiver;
   combining, by a second coupler, the modified reference signal and the signal received by an antenna of the receiver to obtain a combined signal;
   analogue-to-digital converting the combined signal to obtain a digital combined signal;
   analogue-to-digital converting the first reference signal to obtain a first digital reference signal
   combining using a signal-processing device, the digital combined signal and at least the first digital reference signal in order to eliminate the interfering signal present in the digital combined signal; and
   transmitting the digital resulting signal to a data-processing module of the receiver.

9. The method according to claim 8, further comprising analogue-to-digital converting the modified reference signal to obtain a digital modified reference signal, wherein said modified reference signal is taken after the analogue processing circuit, wherein the digital combination, using the signal-processing device, of the digital combined signal, of the first digital reference signal and of the modified reference signal is accomplished in order to eliminate the interfering signal present in the digital combined signal.

10. The method according to claim 8, wherein the combining using the signal-processing device of the digital combined signal and of the first digital reference signal in order to eliminate the interfering signal present in the digital combined signal includes the iterative minimisation of the difference between the digital combined signal and the first digital reference signal in order to send the digital resulting signal to a data-processing module of the receiver device, wherein the difference to be minimised takes the form $R2n - \overline{Ref1n}^T \cdot \overline{a}$, where each term of vector $\overline{Ref1n}$ represents the first digital reference signal with a given digital time lag, and where the terms of vector $\overline{a}$ act as adjustment parameters.

11. The method according to claim 9, wherein the combining using the signal-processing device of the digital combined signal, of the first digital reference signal and of the digital modified reference signal in order to eliminate the interfering signal present in the digital combined signal includes the iterative minimisation of the difference between the digital sum signal, the first digital reference signal and the digital modified reference signal in order to send the digital resulting signal to a data-processing module of the receiver device, wherein the difference to be minimised takes the form $R2n'' = R2n - \overline{Ref1n}^T \cdot \overline{a1} - \overline{Ref2n}^T, \overline{a2}$, wherein each term of vector $\overline{Ref1n}$ represents the first digital reference signal with a given digital time lag, where the terms of vector $\overline{a_1}$ act as adjustment parameters, wherein each term of vector $\overline{Ref2}_n$ represents the digital modified reference signal with a given digital time lag, and where the terms of vector act $\overline{a_2}$ adjustment parameters.

12. The method according to claim 10, wherein the iterative minimisation of the difference between the digital combined signal and at least one digital reference signal is accomplished using an algorithm of the stochastic gradient type.

13. The method according to claim 8, wherein the steps of analogue-to-digital conversion provide a digital representation of the baseband signals.

14. The method according to claim 8, further comprising digital filtering, applied before the digital signal-processing device, of the first digital reference signal, of the digital modified reference signal, and of the digital combined signal, in order to select the frequency range corresponding to the receiver band of the receiver.

15. A system for transmission/reception of a radio signal including at least one transmission antenna connected to a transmitter device and a reception antenna connected to a receiver device, wherein said transmission/reception device includes the device for reducing the intensity of an interfering signal according to claim 1.

16. A device for transmission/reception of a radio signal including an antenna connected both to a transmitter device and to a receiver device, wherein said device includes a device for reducing the intensity of an interfering signal according to claim 1.

* * * * *